United States Patent [19]

Buchta

[11] 4,373,700
[45] Feb. 15, 1983

[54] METAL SEAL FOR A GATE VALVE STEM

[75] Inventor: Ervin A. Buchta, Houston, Tex.

[73] Assignee: FMC Corporation, Chicago, Ill.

[21] Appl. No.: 238,250

[22] Filed: Feb. 25, 1981

[51] Int. Cl.³ .................... F16K 41/14; F16K 41/16
[52] U.S. Cl. .................. 251/214; 251/282; 251/330
[58] Field of Search ............. 251/330, 335 A, 214, 251/282

[56] References Cited

U.S. PATENT DOCUMENTS

| 1,218,252 | 3/1917 | Gibney | 251/330 |
|---|---|---|---|
| 1,237,719 | 8/1917 | Spencer | 251/274 |
| 1,316,585 | 9/1919 | Logan | 251/335 A |
| 1,495,964 | 7/1921 | Reid | 137/630.18 |
| 1,910,994 | 5/1933 | Joyce | 251/335 A |
| 1,926,529 | 5/1928 | Goldsborough | 251/12 |
| 3,013,769 | 3/1961 | Volpin | 251/174 |
| 3,032,310 | 2/1959 | Hansen | 251/327 |
| 3,053,269 | 10/1960 | Allen | 137/315 |
| 3,089,509 | 1/1955 | Collins | 137/454.6 |
| 3,412,750 | 11/1968 | Volpin | 251/214 X |
| 3,993,285 | 11/1976 | Conley | 251/86 |
| 4,029,294 | 6/1977 | McCaskill et al. | 251/282 |
| 4,149,558 | 4/1979 | McGee et al. | 137/315 |
| 4,272,055 | 6/1981 | Herd | 251/330 X |

FOREIGN PATENT DOCUMENTS 1389638 4/1975 United Kingdom .

Primary Examiner—Arnold Rosenthal
Attorney, Agent, or Firm—L. B. Guernsey; W. W. Ritt, Jr.; R. B. Megley

[57] ABSTRACT

A gate valve including the usual resilient seal around the stem also includes a single metal seal which provides a fluid-tight metal-to-metal seal around the stem when the valve is either in a fully opened or a fully closed position. In a fully closed valve position the resilient seal around the valve stem can be replaced without interfering with the operation of the valve. The metal seal can be used to provide and maintain a fluid-tight seal between the stem, the valve body and the valve bonnet when extreme conditions of temperature, pressure and/or fluid contact where the resilient seal might fail.

12 Claims, 3 Drawing Figures

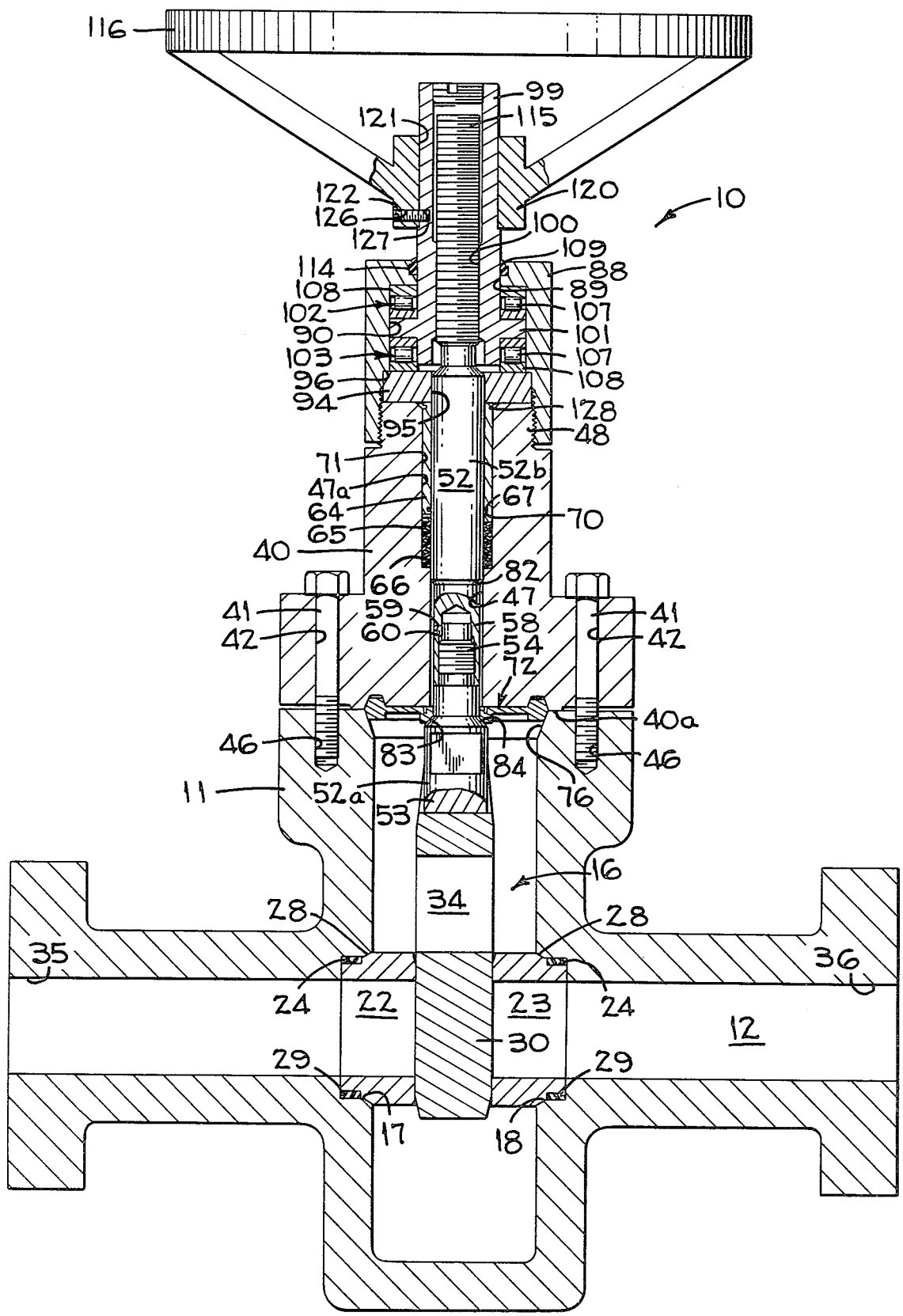
FIG_1

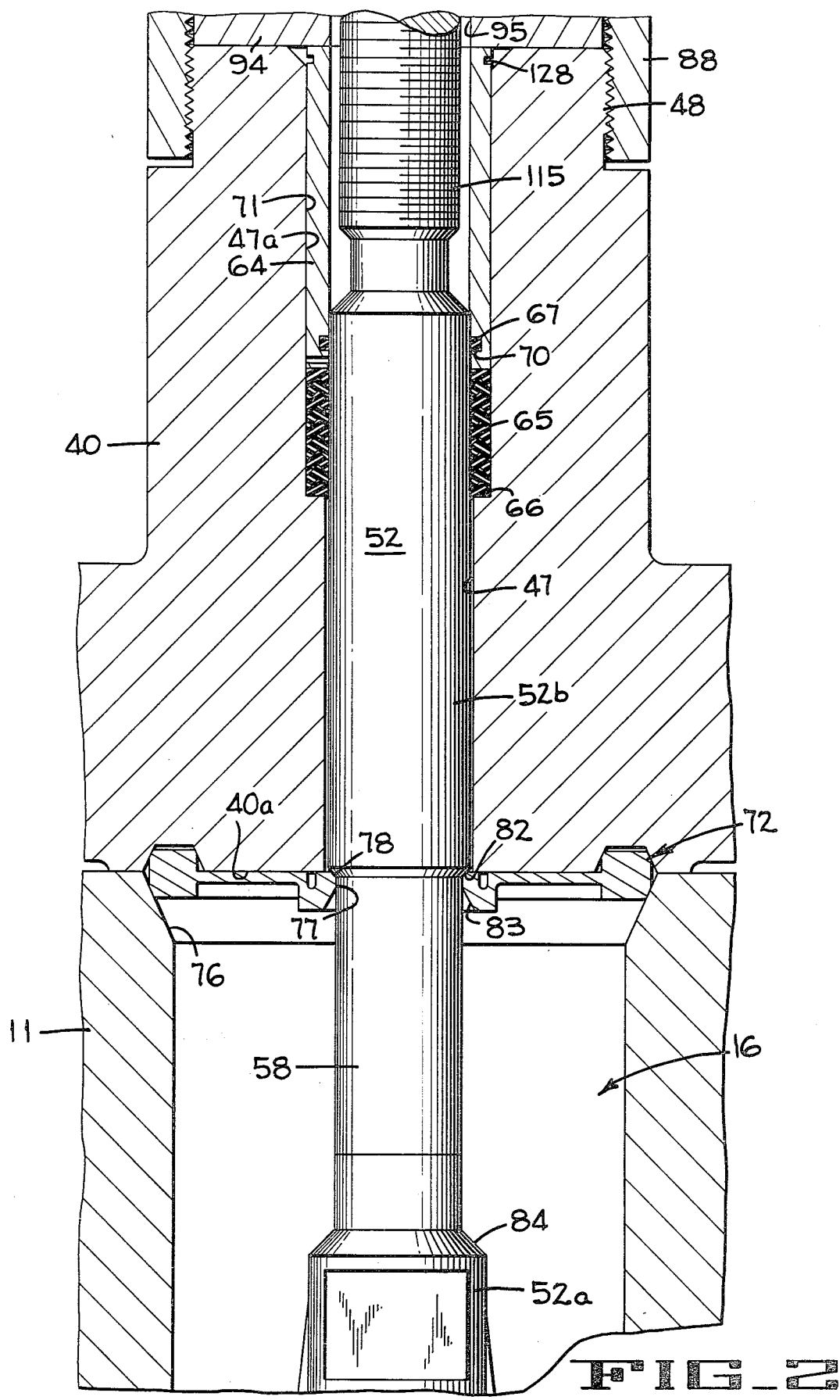

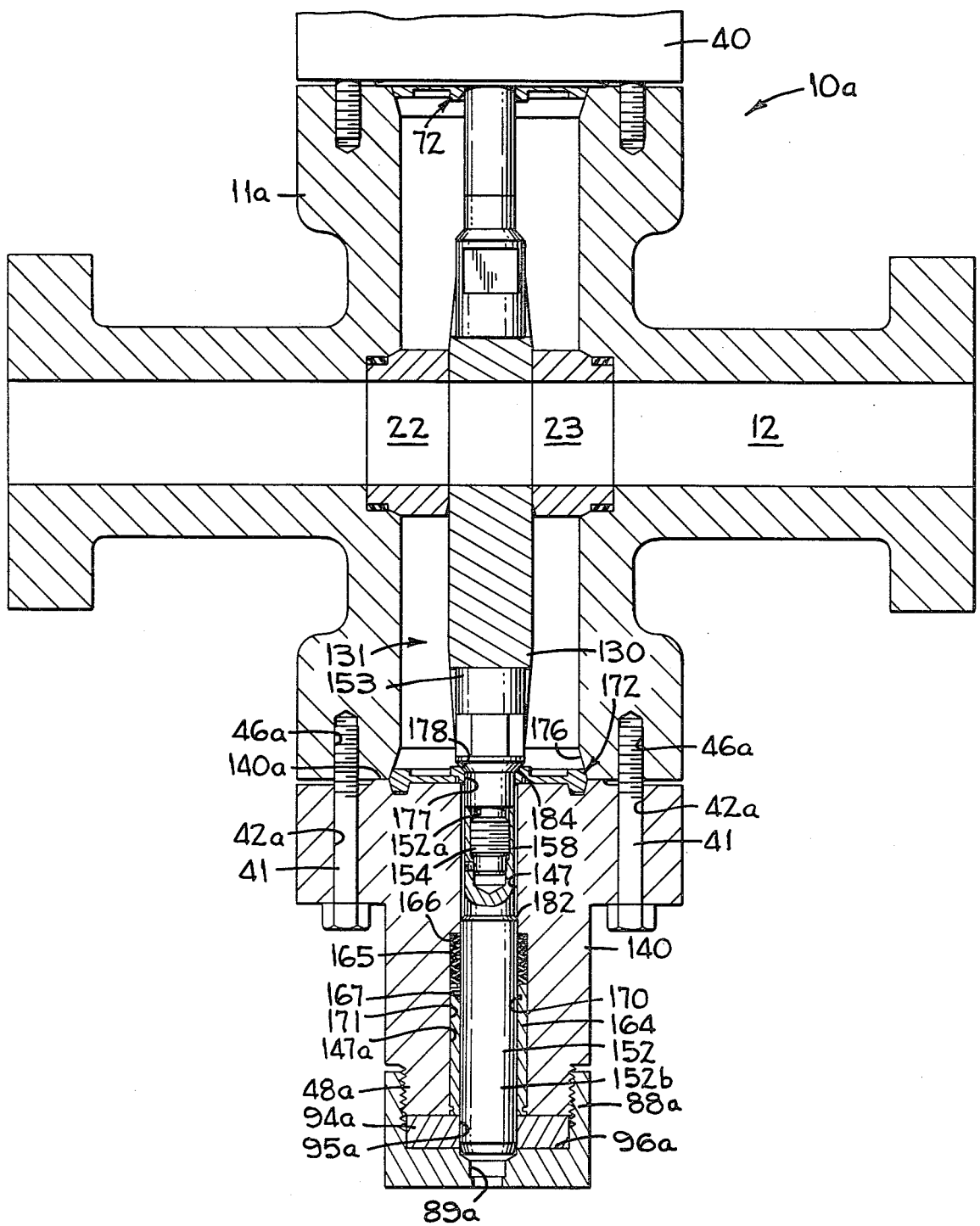

METAL SEAL FOR A GATE VALVE STEM

BACKGROUND OF THE INVENTION

1. Field of the Invention

This invention relates to fluid control valves, and more particularly, to a gate valve for use in both normal and relatively high temperature and/or high pressure environments.

2. Description of the Prior Art

Gate valves and other types of fluid control valves with annular resilient seals are well known and commonly used for controlling the flow of various fluids at ambient or moderate temperatures and at moderate pressures in a wide variety of industries. Such control valves commonly have a generally annular body defining inlet and outlet conduits with a chamber therebetween. A gate having an opening therethrough is disposed in a gate seat mounted within the chamber with the gate connected to a gate valve stem for movement between an open position in which flow is allowed through the conduits and the gate opening, and a closed position in which the flow is blocked by the valve gate. Gate seats mounted in an enlarged portion of the inlet and the outlet conduits adjacent the valve gate provide sealing between the valve gate and each of the adjacent conduits. Any fluid which leaks into the body chamber is prevented from leaking out around the valve stem by resilient packing and by an O ring positioned between the valve stem and a valve bonnet which is mounted atop the valve body to enclose the valve chamber. Such valves function quite satisfactorily at moderate temperatures and pressures, but the packing around the stem can be damaged by extremely high temperatures or pressures in the body chamber and can result in leakage of fluid from the valve.

SUMMARY OF THE INVENTION

The present invention comprises a gate valve having a body with a fluid flow passage extending transversely through the body from an inlet port to an outlet port, and with a gate chamber extending through a portion of the body at right angles to and intersecting the fluid flow passage. A valve gate having a gate port therethrough is slidably mounted in the gate chamber. The valve gate port is aligned with the fluid flow passage to allow the flow of fluid from the inlet port to the outlet port of the valve when the valve gate is in a first position in the gate chamber, and the valve gate blocks the fluid flow passage to prevent fluid flow when the valve gate is in a second position in the gate chamber. A gate stem connected to the valve gate extends upward from the gate chamber, through a bore in the bonnet mounted atop the valve body, to a drive mechanism which moves the gate stem and valve gate between the first and second operating positions in the gate chamber. The bonnet encloses the upper end of the gate chamber to prevent fluid from flowing out of the gate chamber. Elastomeric or other resilient packing is mounted between the gate stem and the wall of the bore and the bonnet to prevent the leakage of fluid between the stem and the bonnet. A metal sealing member mounted between the body and the bonnet provides a seal between these elements and the gate stem extends upward through a bore in the sealing member. A first enlarged portion of the stem presses against the metal sealing member to provide a fluid-tight seal between the stem and sealing member when the stem is in a fully extended position out of the bonnet and a second enlarged portion of the stem presses against the sealing member to provide a fluid-tight seal between the stem and the sealing member when the stem is in a fully retracted position in the gate chamber.

If the resilient packing between the gate stem and the bonnet should be damaged or destroyed, the gate stem can be moved into a fully extended position to provide a fluid-tight seal between the stem and sealing member and the resilient packing can be replaced without interrupting operation of the valve.

BRIEF DESCRIPTION OF THE DRAWINGS

FIG. 1 is a central vertical section of a gate valve embodying the features of the present invention with the valve in a closed position and with the gate stem in a fully extended position.

FIG. 2 is an enlarged vertical section of a portion of the valve of FIG. 1 with the valve stem in a fully retracted position.

FIG. 3 is a central vertical section of a portion of another embodiment of the gate valve of FIG. 1 illustrating the portions of the valve which is different than the valve of FIG. 1.

DESCRIPTION OF THE PREFERRED EMBODIMENT

As illustrated in FIG. 1, a gate valve 10 incorporating the features of the present invention for controlling fluid flow in either direction includes a generally annular body 11 defining a fluid flow passage 12, the illustrated body being adapted for insertion between two opposed standard pipe flanges (not shown). A gate chamber 16 extends through a portion of the body 11 at right angles to and intersecting the fluid flow passage 12, with the passage 12 including a pair of enlarged portions 17, 18 adjacent the chamber 16. Fitted into the enlarged portion of each of the passages is a hollow cylindrical insert 22,23, each insert having an annular groove 24 in an outer wall 28 and with an annular sealing member 29 mounted in the groove 24 to provide a fluid-tight seal between the insert and the enlarged portion of the passage. Each of the inserts 22,23 extends into the gate chamber 16 where it makes sliding contact with a flat valve gate 30 having a port 34 therethrough.

When the valve gate 30 is moved into the closed position shown in FIG. 1 the valve gate 30 blocks the flow of fluid between the right and left portions of the passage 12. When the valve gate 30 is moved into the position shown in FIG. 2 the gate port 34 interconnects the right and left portions of the fluid flow passage to allow fluid to flow between an inlet end 35 and an outlet end 36, although it should be realized that fluid can also flow in the opposite direction with the port 36 being the inlet and the port 35 being the outlet.

A bonnet 40 (FIGS. 1, 2) is attached to the upper portion of the body 11 by a plurality of capscrews 41 each of which projects through a hole 42 in the bonnet and is turned into a threaded bore 46 in the body 11. The bonnet 40 includes a bore 47 extending vertically through the center of the bonnet, and the bonnet includes a cylindrical threaded upper end 48.

Extending through the bore 47 of the bonnet 40 is a generally cylindrical valve stem 52 having a lower portion 52a with a lower end 53 secured to the valve gate 30 and with an upper end 54 threaded to a lower end 58 of an upper stem portion 52b. A setscrew 59 mounted in a threaded hole 60 in the upper stem portion 52b or other suitable locking device prevents the upper and lower portions 52a, 52b from inadvertently becoming separated during normal operation of the valve gate, but allows the upper and lower portions of the stem to unscrew for separation during service operations. An enlarged upper portion 47a of the bore 47 contains a cylindrical sleeve 64 and resilient packing 65 mounted between the sleeve 64 and a shoulder 66 at the lower end of the bore 47a. The packing 65 and an O-ring 67, mounted in an annular groove 70 in the sleeve provide a fluid-tight seal between the valve stem 52 and a wall 71 of the bore 47a of the bonnet.

An annular metal sealing member 72 mounted between a lower end 40a (FIG. 2) of the bonnet and a wedge-shaped surface 76 at the upper end of the body 11 provides a fluid-tight seal between the body 11 and the bonnet 40. The metal sealing member 72 includes an annular bore 77 (FIG. 2) having a wedge-shaped cam surface 78 which mates with a wedge-shaped cam surface 82 on the valve stem portion 52b to provide a fluid-tight seal between the gate chamber 16 and the bonnet bore 47 when the valve stem 52 is in the lower or retracted position shown in FIG. 2. Another wedge-shaped cam surface 83 (FIGS. 1, 2) on the metal sealing member 72 mates with a wedge-shaped cam surface 84 on the valve stem portion 52a to provide a fluid-tight seal between the gate chamber 16 and the bonnet bore 47 when the valve stem 52 is in the upper or extended position shown in FIG. 1. Thus, the valve stem 52 and a single sealing member 72 provide a fluid-tight seal at the upper end of the gate chamber 16 when the valve is in the open position and also when the valve is in the closed position.

An annular cap 88, having a bore 89 (FIG. 1) with an enlarged portion 90 extending vertically through the cap, is threaded to the upper end 48 of the bonnet 40. An annular spacer 94 having a central bore 95 therein is mounted in the enlarged portion of the cap bore between a shoulder 96 and the upper end 48 of the bonnet 40. When the cap is tightened against the spacer 94, the spacer 94 forces the sleeve 64 against the packing 65 and compresses the packing between the stem 52 and the wall 71 of the bonnet 40 to insure a fluid-tight seal between the stem and the bonnet.

A cylindrical drive nut 99 (FIG. 1) having a threaded axial bore 100 and a radially outward flange 101 is rotatably mounted in the bore 89 of the valve cap 88 with the flange 101 and the bore 90. The flange 101 is mounted between a pair of sets of roller bearings or other bearing means 102,103 each having a plurality of rollers 107 mounted in a bearing race 108. An annular sealing member 109 mounted in an annular groove 114 in the valve cap 88 provides sealing between the drive nut 99 and the bore 89 of the valve cap. A threaded upper end 115 of the valve stem 52 is mounted inside the threaded bore 100 of the drive nut 99, so that rotation of the drive nut 99 moves the valve stem 52 up or down inside the nut 99 and inside the bonnet 40 and moves the valve gate 30 up or down inside the gate chamber 16. The drive nut 99 is rotated by a handwheel 116 having a central portion 120 with an axial bore 121 extending through the portion 120 and having an upper portion of the drive nut 99 mounted in the bore 121. The handwheel 116 is secured to the drive nut 99 by a setscrew 122 mounted in a threaded bore 126 in the central portion 120 and extending into a bore 127 in the drive nut 99.

When it is desired to replace either the resilient packing 65 or the O-ring 67 in the bonnet 40, the handwheel 116 (FIG. 1) and the drive nut 99 are rotated until the cam surface 84 of the gate stem is pressed secured against the cam surface 83 of the sealing member 72 to prevent fluid from leaking out of the gate chamber 16. The setscrew 122 is moved radially out of the threaded bore 126 and the bore 127 and the handwheel lifted off the drive nut 99. The valve cap 88 is unscrewed from the bonnet 40 and the valve cap 88 is removed from the bonnet. The drive nut 99 is then unscrewed from the threaded end 115 of the gate stem 52 and lifted off the upper end of the gate stem along with the spacer 94. The tip of a screwdriver (not shown) can be inserted into an annular groove 128 in the upper portion of the cylindrical sleeve 64 and the sleeve lifted out of the bore 47a. The packing 65 and/or the O-ring 67 can be replaced by sliding them down over the stem 52 into position, and the sleeve 64, spacer 94, drive nut 99 and handwheel 116 replaced on the valve 10 in reverse order of the removal. Any pressurized fluid in the gate chamber 16 presses upward against the lower end 52a of the valve stem during the packing replacement to aid in providing firm contact between the surfaces 83,84 and reducing leakage from the gate chamber.

Another embodiment of the gate valve 10a incorporating the features of the present invention is disclosed in FIG. 3. The gate valve 10a of FIG. 3 differs from the gate valve 10 of FIGS. 1 and 2 by the inclusion of a lower cylindrical valve stem 152, the associated cylindrical sleeve 164, packing and an annular cap 88a. All of the details of the gate valve 10a (FIG. 3) positioned above the fluid flow passage 12 are identical to the details of the valve 10 shown in FIGS. 1 and 2, therefore many of these details have been omitted from FIG. 3 in order to enlarge the drawing of the lower portion of the valve. Elements of the valve 10a of FIG. 3 which are similar or identical to the elements of the valve 10 of FIGS. 1, 2 have been labeled with similar numbers.

The body 11a of the gate valve 10a includes a gate chamber 131 extending through a portion of the body 11a at right angles to and intersecting the fluid flow passage 12. The gate chamber 131 extends approximately equidistant above and below the fluid flow passage 12. A bonnet 140 is attached to the lower portion of the body 11a by a plurality of capscrews 41 each of which projects through a hole 42a in the bonnet and is turned into a threaded bore 46a in the body 11a. The bonnet 140 includes a bore 147 extending vertically through the center of the bonnet, and the bonnet includes a cylindrical threaded lower end 48a.

Extending through the bore 147 of the lower bonnet 140 is a generally cylindrical lower valve stem 152 having an upper portion 152a with an upper end 152 secured to the valve gate 130 and with a lower end 154 threaded to an upper end 158 of a lower stem portion 152b. An enlarged lower portion 147a of the bore 147 contains the cylindrical sleeve 164 and a resilient packing 165 mounted between the sleeve 164 and a shoulder 166 at the upper end of the bore 147a. The packing 165 and an O-ring 167, mounted in an annular groove 170 in the sleeve provided a fluid-tight seal between the valve stem 152 and a wall 171 of the bore 147a of the bonnet.

An annular metal sealing member 172 mounted between an upper end 140a of the bonnet 140 and a wedge-shaped surface 176 at the lower end of the body 11a provides a fluid-tight seal between the body 11a and the bonnet 140. The metal sealing member 172 includes an annular bore 177 having a wedge-shaped cam surface 178 which mates with a cam surface 184 on the valve stem 152a to provide a fluid-tight seal between the gate chamber 131 and the bonnet bore 147 when the valve stem 152 is in the retracted position shown in FIG. 3. Another wedge-shaped cam surface 182 presses against the metal sealing member 172 to provide a fluid-tight seal between the gate chamber 131 and the bonnet bore 147 when the valve stem 152 is in the upper or extended position as shown in FIG. 1. Thus, the valve stem 152 and a single metal sealing member 172 provide a fluid-tight seal at the lower end of the gate chamber 131 when the valve is in the open position and also when the valve is in the closed position.

The annular cap 88a having a bore 89a extending vertically through the cap, is threaded to the lower end 48a of the bonnet 140. An annular spacer 94a having a central bore 95a therein is mounted in the enlarged portion of the cap bore between a shoulder 96a and the lower end of the bonnet 140. When the cap 88a is tightened against the spacer 94a, the spacer 94a forces the sleeve 164 against the packing 165 and compresses the packing between the stem 152 and the wall 171 of the bonnet 140 to insure a fluid-tight seal between the stem and the bonnet.

The packing 165 and the O-ring 167 (FIG. 3) provide a primary seal about the lower valve stem 152, and the packing 65 and the O-ring 67 (FIG. 1) provide a primary seal about the upper valve stem 52. The metal sealing members 72,172 provide secondary seals about the valve stems 52,152 during normal operation and provide sealing in case of damage to the primary seals.

The present invention provides a single metal sealing member which combines with cam surfaces on a valve stem to develop a metal-to-metal seal which prevents fluid leakage from the gate chamber of a valve when the valve is either open or closed. If the usual resilient packing around the valve stem should be damaged the packing can be replaced while the valve remains in either the open or closed position without interfering with the operation of the valve.

Although the best mode contemplated for carrying out the present invention has been herein shown and described, it will be apparent that modification and variation may be made without departing from what is regarded to be the subject matter of the invention.

What is claimed is:

1. A valve comprising:
a body having a fluid flow passage extending transversely therethrough between an inlet and an outlet of said passage, and a gate chamber extending through a portion of said body at right angles to and intersecting said fluid flow passage;
a valve gate having a port therethrough;
means for slidably mounting said valve gate in said valve body to connect said passage outlet to said passage inlet through said valve gate port when said valve gate is in a first position, said valve gate blocking the flow of fluid between said passage inlet and said passage outlet when said valve gate is in a second position;
a bonnet mounted on said valve body to enclose said gate chamber, said bonnet having a bore therethrough;
a metallic sealing member mounted between said body and said bonnet, said sealing member having a bore therethrough;
a gate stem mounted through said bore in said bonnet and through said bore in said sealing member, said gate stem having first and second enlarged portions, said first enlarged portion forming a fluid-tight seal with said sealing member when said stem is in a fully extended position and said second enlarged portion forming a fluid-tight seal with said sealing member when said stem is in a fully retracted position, said first and said second enlarged portions of said gate stem each including a wedge-shaped cam surface which mates with a wedge-shaped cam surface on said metallic sealing member to form said fluid-tight seal between said gate stem and said metallic sealing member when said gate stem is either fully retracted or fully extended; and
means for connecting said stem to said valve gate.

2. A valve as defined in claim 1 including means for moving said valve stem to an extended position wherein said attached valve gate has the gate port aligned with said fluid flow passage to allow fluid to flow through said fluid flow passage and for moving said valve stem to a retracted position wherein said valve gate blocks the flow of fluid through said fluid flow passage.

3. A valve as defined in claim 1 wherein said first enlarged portion of said gate stem is mounted above said sealing member and said second enlarged portion of said gate stem is mounted below said gate stem.

4. A valve as defined in claim 1 wherein said gate stem includes means for selectively disconnecting the portion of said gate stem having said first enlarged portion from the portion of said gate stem having said second enlarged portion, to facilitate replacement of said metallic sealing member 5. A valve as defined in claim 1 including resilient packing mounted between said gate stem and the wall of said bore through said bonnet, to provide a fluid-tight seal between said gate stem and said bonnet.

6. A valve as defined in claim 1 wherein said metallic sealing member is removably mounted between said body and said bonnet.

7. A valve comprising:
a body having a fluid flow passage extending transversely therethrough between an inlet and an outlet of said passage, and a gate chamber extending through a portion of said body at right angles to and intersecting said fluid flow passage;
a valve gate having a port therethrough;
means for slidably mounting said valve gate in said valve body to connect said passage outlet to said passage inlet through said valve gate port when said valve gate is in a first position, said valve gate blocking the flow of fluid between said passage inlet and said passage outlet when said valve gate is in a second position;
a bonnet mounted on said valve body to enclose said gate chamber, said bonnet having a bore therethrough;
a gate stem extending through said bore in said bonnet and having first and second enlarged portions;
a metallic sealing disc located between said body and said bonnet and surrounding said gate stem, said disc having first and second cam surfaces, said first cam surface forming a fluid-tight seal with said first enlarged portion of said gate stem when said stem is fully extended, said second cam surface forming a fluid-tight seal with said second enlarged portion of said gate stem when said stem is fully retracted; and means for connecting said stem to said valve gate.

8. A valve as defined in claim 1 including first and second bonnets each having a bore therethrough, means for mounting said first bonnet at a first end of said gate chamber, means for mounting said second bonnet at a second end of said gate chamber, first and second metallic sealing members each mounted between said body and a corresponding one of said first and second bonnets, each of said sealing members having a bore therethrough, first and second gate stems each mounted through one of said bores in said sealing members, each of said gate stems having first and second enlarged portions, a first enlarged portion of each gate stem forming a fluid-tight seal with a corresponding one of said sealing members when a first gate stem is in a fully extended position, a second enlarged portion of each gate stem forming a fluid-tight seal with said corresponding one of said sealing members when said first gate stem is in a fully retracted position, and means for connecting said first and said second gate stems to said valve gate.

9. A gate valve having a body with a fluid flow passage extending transversely through said body and with a gate chamber extending through a portion of said body at right angles to and intersecting said fluid flow passage, a valve gate having a port therethrough, means for slidably mounting said valve gate in said gate chamber to align said gate port with said fluid flow passage when said valve gate is in a first position and said valve gate blocking said fluid flow passage when said valve gate is in a second position, and a bonnet mounted on said valve body to enclose said gate chamber, said bonnet having a bore therethrough, wherein the valve improvement comprises:

a metallic sealing member mounted between said body and said bonnet, said sealing member having a bore therethrough;

a gate stem mounted through said bore in said bonnet and through said bore in said sealing member, said gate stem having a first cam surface which presses against said sealing member to form a fluid-tight seal around said sealing member bore when said stem is in a fully extended position, and a second cam surface which presses against said sealing member to form a fluid-tight seal around said sealing member bore when said stem is in a fully retracted position.

10. A gate valve as defined in claim 9 including means for connecting said gate stem to said valve gate and means for moving said stem and said valve gate between said extended and said retracted positions.

11. A gate valve as defined in claim 10 including means for mounting said stem moving means atop said valve bonnet.

12. A gate valve as defined in claim 10 wherein said metallic sealing member comprises a disc having first and second cam surfaces, said first cam surface of said sealing member pressing against said first cam surface of said gate stem to form a fluid-tight seal when said stem is fully extended, said second cam surface of said sealing member pressing against said second cam surface of said gate stem to form a fluid-tight seal when said stem is fully retracted.

* * * * *